UNITED STATES PATENT OFFICE.

REGINALD K. BAILEY, OF LAWRENCE, KANSAS.

OXIDATION OF METHANE.

1,319,748.   Specification of Letters Patent.   Patented Oct. 28, 1919.

No Drawing.   Application filed May 13, 1915. Serial No. 27,825.

*To all whom it may concern:*

Be it known that I, REGINALD K. BAILEY, a citizen of the United States, and a resident of Lawrence, in the county of Douglas and State of Kansas, have invented certain new and useful Improvements in the Oxidation of Methane, of which the following is a specification.

My invention relates to improvements in processes for the oxidation of methane, and it consists in the steps hereinafter enumerated.

An object of my invention is to provide a process by means of which the oxidation of methane to form such products as formaldehyde may be carried out in a minimum of time.

A further object of my invention is to provide a process in which the oxidizing agent is recoverable.

A further object of my invention is to provide a process in which the yield of the products which result from the oxidation, is considerably increased.

A further object of my invention is to provide a process which may be carried out at a relatively low temperature.

Other objects and advantages will appear in the following specification, and the novel features of the invention will be particularly pointed out in the appended claims.

The invention will be best understood by giving a specific example, but it will be understood that this is for the purpose of illustration only, and that the process may be varied as to quantities and temperatures within limits, without departing in the least from the spirit and scope of the invention.

In carrying out the invention, I may take one volume of methane or an equivalent of methane, in the form of natural gas or other gas having a high percentage contents of $CH_4$. This is mixed with two volumes of nitric oxid and a sufficient volume of oxygen or air to unite with the nitric oxid to change it to nitrogen peroxid.

This mixture is then passed through a hot tube of porcelain. Instead of porcelain I may use other material which is not affected by the gases. The temperature of the tube is preferably at fairly a red heat.

It is highly desirable at this point of the process to prevent the further oxidation or the further decomposition of the product, such as formaldehyde. This may be done in one or more ways.

(*a*) The products of the reaction are cooled as quickly as possible by conducting them into a cooling chamber where the products come into contact with a suspension or sludge of calcium carbonate. The calcium carbonate tends to unite with the oxids of nitrogen, except nitric oxid, thus preventing the formation of nitric acid.

The formaldehyde goes into solution in the water of the sludge, while, as stated above, the calcium carbonate renders the solution neutral. The solid portions of the sludge are now filtered off and the filtrate containing the formaldehyde in solution may be distilled to recover the formaldehyde.

(*b*) Instead of using a reagent such as calcium carbonate to render the solution neutral, the hot gases from the first step, *i. e.*, that in which the mixed gases are passed through the heated tube, may be passed over calcium oxid or a similar oxid whereby the water of the reaction is absorbed and the formation of nitric acid or nitrous acid is prevented. Were these acids permitted to form, they would oxidize the formaldehyde, forming carbonic acid and water.

The formaldehyde may be recovered by distillation in the usual way.

It will be seen that by carrying out the process as described, the higher oxids of nitrogen are reduced to nitric oxid as much as possible, which is directly returnable to the system. Furthermore, this is accomplished without the complete oxidation of the methane and hence the loss of the oxidation products of the methane.

The process herein described is designed to be used for the commercial or industrial manufacture of such products as formaldehyde. One trouble heretofore has been that in the oxidation of methane, the products, such as formaldehyde, which are formed, are destroyed to a large extent by the subsequent operations.

In this form of the process, as in the first, the products of the oxidation of the methane, such as formaldehyde, may be recovered by distillation or in any suitable manner.

It will be observed that the process may be carried out either by the use of certain oxids of nitrogen and methane, or nitric oxid and air or oxygen. In other words, when the methane is treated with a combination of nitrogen and oxygen suitable for the oxidation of the methane, the products desired are produced.

As stated in the beginning, the process may be carried out at a relatively low temperature, as for instance, at 450° C. The yield of the products is increased because of the fact that the products are not reoxidized and destroyed. Since in the process the higher oxids of nitrogen are reduced to nitric oxid, the latter is returnable directly to the system. Finally the time of the reaction is greatly diminished, thus tending to render the process economical, since large quantities of the product may be made in comparatively short time.

I claim:—

1. The herein described process of oxidizing methane which consists in mixing with the methane a substance having nitrogen and oxygen combined, at least in substantial parts chemically, so as to constitute an oxidizing gas, heating the mixture, cooling the heated mixture, and simultaneously neutralizing certain of the products by means of calcium carbonate or its equivalent.

2. The herein described method of oxidizing methane which consists in mixing with the methane a substance having nitrogen and oxygen combined, at least in substantial parts chemically, so as to constitute an oxidizing gas, heating the mixture, cooling the heated mixture, and simultaneously neutralizing the product and preventing the formation of oxidizing agents.

3. The herein described steps in a process of oxidizing methane, which consists in mixing with the methane a substance having nitrogen and oxygen combined, at least in substantial parts chemically, so as to constitute an oxidizing gas, heating the mixture and then cooling the mixture.

4. The herein described process of oxidizing methane which consists in mixing with the methane a substance containing a nitrogen and oxygen combined, at least in substantial parts chemically, so as to constitute an oxidizing gas, heating the mixture, subsequently cooling the mixture in contact with a sludge of a carbonate, whereby the solution is neutralized and the formation of an oxidizing agent is prevented.

REGINALD K. BAILEY.

Witnesses:
L. A. STANLEY,
SOLON C. KEMON.